United States Patent [19]
Koizumi et al.
[11] 3,857,689
[45] Dec. 31, 1974

[54] ION EXCHANGE PROCESS FOR MANUFACTURING INTEGRATED OPTICAL CIRCUITS

[75] Inventors: Ken Koizumi, Hyogo; Toru Sumimoto, Tokyo; Shigeo Matsushita, Tokyo; Motaoaki Furukawa, Tokyo, all of Japan

[73] Assignee: Nippon Selfoc Company, Limited, Tokyo, Japan

[22] Filed: Dec. 29, 1972

[21] Appl. No.: 319,452

[30] Foreign Application Priority Data

| | | |
|---|---|---|
| Feb. 2, 1972 | Japan | 47-012472 |
| Feb. 2, 1972 | Japan | 47-012473 |
| Dec. 28, 1971 | Japan | 46-1147 |

[52] U.S. Cl. .......... 65/30, 65/60, 65/DIG. 7, 117/212, 117/217, 204/192
[51] Int. Cl. .......... C03c 21/00, C03c 17/06
[58] Field of Search .......... 65/DIG. 7, 30, 60; 117/212, 221, 217, 227; 156/17; 204/192

[56] References Cited

UNITED STATES PATENTS

| | | | |
|---|---|---|---|
| 3,498,833 | 3/1970 | Lehrer | 117/212 |
| 3,542,536 | 11/1970 | Flam et al. | 65/DIG. 7 |
| 3,573,948 | 4/1971 | Tarnopol | 65/30 X |
| 3,629,776 | 12/1971 | Watano | 117/212 X |
| 3,647,406 | 3/1972 | Fisher | 65/DIG. 7 |
| 3,647,406 | 3/1972 | Fisher | 65/30 |
| 3,652,244 | 3/1972 | Plumat | 65/30 |
| 3,661,436 | 5/1972 | Horwath et al. | 117/212 X |
| 3,691,045 | 9/1972 | Lieberman | 204/192 |
| 3,717,564 | 2/1973 | Blatt | 117/227 X |
| 3,723,080 | 3/1973 | Howell et al. | 65/30 |
| 3,817,730 | 6/1974 | Vchida | 65/30 |

*Primary Examiner*—Robert L. Lindsay, Jr.
*Assistant Examiner*—Kenneth M. Schor
*Attorney, Agent, or Firm*—Sandoe, Hopgood & Calimafde

[57] ABSTRACT

An integrated circuit is constructed by first forming a mask that defines a desired optical circuit pattern on a transparent glass substrate. The mask may be made of Ti, Ta, Nb, Zr, Cr, Al or an oxide thereof. An ion exchange is then promoted by contacting the substrate with molten salt containing monovalent positive ions which have a greater effect on the refractive index that the positive ions in the substrate. This causes an increase in the refractive index of the unmasked portions of the substrate surface as compared to the other portions thereof.

6 Claims, 3 Drawing Figures

ION EXCHANGE PROCESS FOR MANUFACTURING INTEGRATED OPTICAL CIRCUITS

BACKGROUND OF THE INVENTION

The present invention relates to a method for making an integrated optical circuit utilizing an ion exchange process.

In recent years, the field of opto-electronics has developed rapidly. It has become a matter of great interest to the industry to realize an integrated optical circuit which corresponds to the integrated electrical circuit. In the *Bell System Technical Journal*, September issue, 1969, S. E. Miller has proposed an integrated optical circuit and possible fundamental techniques for the manufacture thereof. A specific workable manufacturing method, however, has not yet been disclosed. An object of the present invention is to provide a method for making such integrated optical circuits.

As fundamental techniques applicable to the manufacture of the integrated optical circuit, there are at present the high-frequency sputtering process, the ion implantation process, the ion exchange process, etc.

In the high-frequency sputtering process, a sputterer evaporates a substance for forming circuitry onto a substrate. Since atoms of the substance are uniformly and densely bound with difficulty, a light conducting path thus formed is prone to scatter light, and is susceptible to spurious influences at the boundary surface between the substrate and the substance. As a result, the transmission loss becomes very large. Furthermore, in cases where the substance is a dielectric, the sputtering rate is very low, which leads to a large number of operations required for manufacture.

On the other hand, the ion implantation process forms a light conducting path in such a manner that a substance which forms the path is forcible injected into a substrate usually made of a dielectric. In order to form a light conducting path by this process, the difference in the refractive index between that path and the substrate must be at least 0.001. Large quantities of heavy atoms must be injected to meet this requirement, but the injection is technically very difficult. Even if the problem is solved, a stress and strain caused within the substrate will induce optical damage, so that the light conducting path is disadvantageous and lacking in stability.

THE INVENTION

The ion exchange process employed in the present invention is a method in which, by way of example, a glass substrate containing a comparatively large amount of alkali metal is brought, at a suitable temperature, into contact with a salt containing metallic ions which have a greater effect on the refractive index than ions of the aforesaid metal. The metallic ions in the glass substrate are thereby replaced by the metallic ions in the salt to form the desired light transmission paths. It has become clear that, with this method, the problems of non-uniformity of the light transmission paths and distortion that have been the disadvantages of the high-frequency sputter process and the ion implantation process are substantially eliminated to readily form a stable low loss circuit. As to the fact that the ion exchange process is excellent in comparison with the ion implantation process and the high-frequency sputter process, a discussion may be found in a paper entitled "Dielectric Optical Micro-Circuit by Ion Exchange Process," contained on page 83 of *The Proceedings of the 32nd Science Lecture Meeting of the Institute of Applied Physics* and in Japanese Patent Application No. 105247/1969, hence, no detailed description is necessary or will be given here.

The refractive index of the light conducting path formed by the ion exchange process in a direction perpendicular to that of light propagation decreases continuously downwardly to the value of the refractive index of the substrate itself in a direction from the central part to the periphery of the light conducting path, in cases where the light transmission path is formed within the substrate. It decreases continuously downwardly to the value of the refractive index of the substrate itself in a direction from the surface of the substrate towards the inner part thereof, in cases where the light conducting path is formed in a surface layer of the substrate.

In order to form the desired optical circuit by the ion exchange process, it is necessary to provide a mask on the substrate and to carry out ion exchange in selected areas only, in accordance with the pattern of the mask. In the realization of an integrated optical circuit, the material of the mask and the method of forming it constitute key points. As the salt for use in the ion exchange, a sulfate or nitrate containing monovalent positive ions of thallium (T1), an alkali metal, or the like is suitable. Especially, a mixed salt of $T1_2SO_4$ and $ZnSO_4$ is excellent since it is stable at the ion exchange temperature employed in the present invention. A transparent plate of optical glass containing comparatively large quantities of alkali metal is used as the substrate. In this case, because of the necessity for rapidly effecting the ion exchange, the temperature of the glass should be raised to a value not lower than the strain point and not higher than the softening point. In case of the aforesaid glass, it is approximately 400°C–500°C. At this temperature, the aforesaid molten salt is in a state in which it readily reacts with another substance, especially a metal. Accordingly, the following are required as properties of the mask material:

1. The adhering strength with the glass substrate is high, and no exfoliation occurs, and even at temperatures as high as approximately 400°C -500°C.

2. At the above-mentioned high temperatures, the mask material does not readily react with the molten salt.

On the other hand, in order to form an integrated optical circuit, the mask material on the glass substrate should be worked into a desired pattern. In this case, a method in which masking with photoresist is performed and then etching is carried out, may be employed. Since the photoresist is generally likely to be corroded by a strong acid or strong alkali, the mask material should be one which can be etched by some other solution. Accordingly, a workable mask material must further satisfy the following condition:

3. It is easily etched uniformly by a solution other than a strong acid or a strong alkali.

As a result of trials of the ion exchange of glass substrates subjected to masking with a variety of materials, we have found that the usual dielectric substances and exceptional metals of Titanium (Ti), Tantalum (Ta), Niobium (Nb), Zirconium (Zr), Chromium (Cr) and Aluminum (Al) are suitable with respect to the above-mentioned requirements (1) and (2). It has also been found that, in order to fulfill requirement (3), metals are generally suitable, whereas the usual dielectric substances are unsuitable.

The metals Ti, Ta, Nb, Zr, Cr, and Al have been accordingly selected as materials satisfying all the requirements, (1), (2) and (3). Further, the range of coefficients of thermal expansion of these mask materials at the ion exchange temperature is $70 \times 10^{-7}$ to $105 \times 10^{-7}/°C$, which corresponds exactly with the range of coefficients of thermal expansion of usualy types of glass, $70 \times 10^{-7}$ to $110 \times 10^{-7}/°C$. In cases where the glass substrate is made of, for example, F2, which is typical optical glass of the lead silicate series, the coefficient of thermal expansion is $102 \times 10^{-7}/°C$. On the other hand, the coefficient of thermal expansion of Ti is $105 \times 10^{-7}/°C$, and that of Cr is $104 \times 10^{-7}/°C$. The mask material of Ti or Cr therefore has a coefficient of thermal expansion identical to the glass substrate, so that deformation of the substrate due to mismatching caused by thermal expansion does not occur. In addition, the adherence strength of the metals with the glass substrate is high. Moreover, phosphoric acid, a weak acid, can be used as an etching agent. It is accordingly, possible to say that the metals Ti and Cr are particularly excellent mask materials.

Furthermore, a series of experiments have revealed that specific dielectric substances which are oxides if these metals are also suitable and meet requirements (1), (2) and (3). Adoptable methods of forming films of such oxides are, the low-temperature or high-temperature oxidation process, the anodic oxidation process and the sputtering process. An oxide film which is obtained in such a way that, using solid metal as a targe, DC or high-frequency sputtering is carried out in a mixed atmosphere consisting of an inert gas and oxygen gas, or an oxide film which is obtained in such a way that a sputtered metal film is exposed to an oxygen gas atmosphere at a high temperature. The oxide film prepared in this manner is strong enough to survive the ion exchange process, and hence can be said to be an excellent mask. The oxides are very close in the coefficient of thermal expansion of the glass substrate within the above-mentioned temperature range, so that deformation of the glass substrate due to the thermal effect and exfoliation of the mask at the ion exchange can be prevented. In addition, the adherance strength of the oxides is high. It is accordingly possible to say that the oxides of the metals Ti, Ta, Nb, Zr, Cr and Al are particularly excellent materials.

However, the oxide films produced by high-frequency sputtering are transparent films, which are generally colorless or slightly colored in yellowish brown. This causes a problem, especially in cases where a minute mask pattern is manufactured by the photo-exposure technique. More specifically, an original plate of a circuit having a desired pattern is brought into contact through photoresist with the transparent oxide film provided on a transpatent glass substrate. The photoresist is illuminated through the original plate by light for exposure thereof. Then, the illuminating light permeates the oxide film and the glass substrate, which are both transparent. The permeating light is partially scattered or reflected from the surface of the glass substrate on the side with which the original plate is not in contact, and is partially reflected by a plane or planes of reflection after permeation through the glass substrate, to reach the photoresist portion again. In consequence, the reflected light rays interfere with each other, to bring about unnecessary interference fringes in the photoresist portion. Accordingly, in the photoresist portion, after exposure and subsequent development, an irregular and unnecessary pattern attributable to the interference fringes appears in addition to the desired pattern. This makes it difficult to obtain a minute circuit pattern.

In this respect, the inventors have found experimentally that the above problem can be solved by bringing an opaque metal film into close contact with the transparent oxide film. The new metal film prevents the light from being transmitted into the glass substrate, and accordingly prevents the photo-resist portion from being subjected to the undesired interference effect. Since the oxide film is produced by the high-frequency sputtering of the metal in the atmosphere of the mixed gas consisting of oxygen and an inert gas such as argon (oxygen accounting for between 60 and 100 percent of this mixture by mole weight), the metal film can be formed on the oxide film in close contact therewith by sputtering the same metal once more in an atmosphere of argon gas within the identical high-frequency sputtering equipment used for the formation of the oxide film. That is to say, using the identical high-frequency sputtering equipment and through the mere change-over of the gaseous atmosphere, the metal film for preventing the interference can be formed on the oxide film for the ion exchange by performing high-frequency sputtering.

BRIEF DESCRIPTION OF THE DRAWINGS

The preferred embodiments of the present invention will now be described with reference to the accompanying drawings, in which.

DESCRIPTION OF THE PREFERRED EMBODIMENTS

Figure 1:
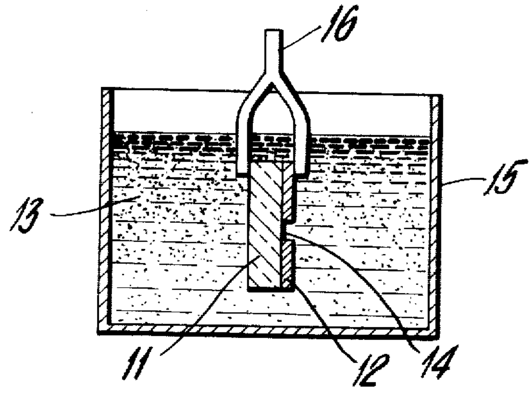
FIG. 1 is a schematic view pertaining to a method for manufacturing an integrated optical circuit according to the first embodiment of the invention.

Referring to FIG. 1, Ti is evaporated onto a plate 11 of glass F2 employed as a glass substrate by a high-frequency sputtering process. A desired photoresist pattern having a channel of a width of 50 microns is printed on the evaporated layer. Etching is carried out with phosphoric acid, and the photoresist is removed. Then, a Ti mask pattern 12 is formed. The structure consisting of the glass plate 11 and the Ti mask 12 is immersed for about 3 hours in a molten salt bath 13 heated to 450°C and containing $Tl_2SO_4$ and $ZnSO_4$ at equal mole ratio. Then, a desired light conducting path is formed from a portion 14 with no protectice Ti mask (the portion being approximately 50 microns wide) into the glass substrate in such manner that the refractive index is larger by 0.005 on the surface of the substrate than in the substrate and a part larger in the refractive index by 0.0025 than the substrate extends over a depth of 5 microns and a width of 60 microns. This ensures that the masking effect of Ti is sufficient. In the formation of the light conducting path, the distortion of the substrate due to the thermal effect is negligible.

With the light conducting path obtained by the foregoind method, light is propagated such that it is subjected to total reflection at the glass surface forming one of the walls of the light conducting path. The light can, therefore, be influenced by minute inhomogeneity existent on the glass surface, to bring about an increase in light transmission loss. Especially, in cases where the light conducting path is long, it is necessary to minimize the light loss. To this end, a method is adopted in which the glass substrate already being formed with the light conducting path and having the protective mask disposed thereon is again held in a molten salt containing monovalent positive ions which have less effect on the refractive index than the monovalent positive ions in the light conducting path. This effects an ion exchange, whereby the part of the light conducting path with the higher refractive index is left in the interior of the glass substrate only to make corrections so that light may be propogated inside the glass surface without undergoing the total reflection at the glass surface.

Now, a second embodiment will be explained. Referring to FIG. 1, Ti is evaporated on an F2 glass plate 11 for a glass substrate by the high-frequency sputtering process. A desired photoresist pattern having a channel of 50 microns in width is printed on the evaporated Ti layer, and is etched with phosphoric acid, to form a pattern 12. The resulting structure is held for about four hours in a molten salt 13 heated to 450°C and containing $Tl_2SO_4$ and $ZnSO_4$ at a ratio of equal moles. Thus, from a portion 14 (approximately 50 microns wide) having no protective Ti mask toward the glass substrate, a portion is formed which is higher in refractive index than the glass substrate by 0.005 at the maximum and by at least 0.0025 which extends over a width of approximately 60 microns and a depth of 10 microns. The structure thus treated is held for 3 hours in a molten salt of $KNO_3$ heated to 450°C. Then, in the substrate corresponding to the portion 14 where the protective Ti mask is not present, the refractive index decreases by 0.005 at the surface and by 0.0025 at a depth of approximately 5 microns. As a result, a light conducting path having a width of approximately 60 microns and a refractive index larger by at least 0.0025 is formed, and a second part of the glass substrate is formed in the interior of the glass which extends from the center of the unmasked portion 14. This second portion has a depth of approximately 5 to 10 microns as measured from the surface of the glass plate. With the light conducting path formed in this way, light is not propagated repeating total relection at the surface of the glass substrate as in the previously-stated manner, but it advances along the light conducting path of the higher refractive index inside the glass substrate. The light is, therefore, not influenced by the glass surface at all, so that the propagation loss of light is greatly reduced.

A third embodiment of the present invention, illustrated in FIG. 2, will now be described. Reference numeral 11 designates glass F2 employed for a glass substrate. On the glass substrate 11, a uniform thin film 12, made of titanium oxide and having a thickness of approximately 5,000 angstroms, is formed as a mask by high-frequency sputtering of Ti in a gaseous mixture atmosphere consisting of $O_2$ and $Ar_2$. By mole weight, $O_2$ forms 60% to 100% of the atmosphere. The preferred atmosphere contains, by mole weight 80% $O_2$ and 20% $Ar_2$.

A curved photoresist pattern having a channel width of 50 microns is printed on the mask film 12, the oxide film is etched with phosphoric acid, and the photoresist is removed. Then a curved pattern 21(FIG. 3) of titanium oxide is formed.

Figure 3:
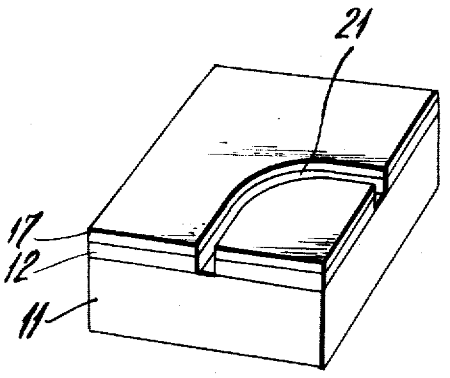

FIG. 3 illustrates the state in which the pattern 21 is formed in the titanium oxide film on the glass substrate. The structure is held for about three hours in contact with a salt 13 heated to 450°C and containing $Tl_2SO_4$ and $ZnSO_4$ at equal mole weights (FIG. 1). As a result, from the unmasked portion 21 (FIG. 3) an area extending over a depth of 5 microns into the glass plate, and a width of 60 microns is formed in which the refractive index is larger by 0.005 at the surface of the substrate than in the interior thereof and larger by at least 0.0025 in the interior of the portion than in the interior of the substrate. Thus, a curved light conducting path is constructed. It is thus demonstrated that the titanium oxide film functions excellently as a protecting mask.

With the light conducting path obtained by the above method, propagated light is totally reflected at the glass surface forming one of the walls of the light conducting path. Therefore, the propagation is influenced by the inhomogeneity of the glass surface, and an increase in light loss is sometimes brought about. In this case, in order to eliminate the influence of the glass surface, corrections, as will be stated below, can be made by embedding the light conducting path into the substrate.

Figure 2:
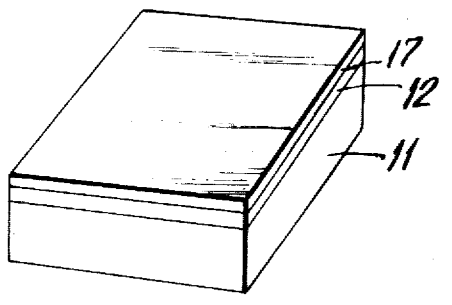
FIGS. 2 and 3 are perspective views of the formation of a mask pattern according to the invention.

The mask pattern is formed by the same method as in the above description referring to FIGS. 1 to 3. The resulting structure is held by a holder 16 as shown in FIG. 1. It is kept for four hours in contact with the foregoing salt heated to 450°C in a tank 15. In this way, a portion which has a larger refractive index than the glass substrate by 0.005 at the maximum and by 0.0025 or more over a width of approximately 60 microns and a depth of 10 microns is formed from the portion 21 with no titanium oxide mask towards the glass substrate. Thereafter, the structure is kept for three hours in contact with $KNO_3$ salt heated to the same temperature. Then, in correspondence with the portion 21 having no titanium oxide mask, the refractive index decreases by 0.005 at the surface of the glass plate and by 0.0025 at a depth of approximately 5 microns. In consequence, a portion that serves as a light conducting path can be formed in the interior of the glass substrate, this portion extending along the center at the portion 21 and from a depth of approximately 5 microns to a depth of 10 microns as measured from the surface of the glass substrate. The light path portion has a width of approximately 60 microns and is higher in refractive index than the surrounding portion by 0.0025 or more.

The masking metal oxide film 21 is semi-transparten. Therefore, as previously stated in this specification, interference is prone to occur to make the edges of the mask pattern indistinct at the photo-etching of the pattern. In order to avoid the inconvenience, it is desirable to further provide a metal film on the surface of the metal oxide film 12. A method for accomplishing this will be explained with reference to FIG. 2. First, on an F2 glass plate 11 used as a glass substrate, Ti is subjected to high-frequency sputtering in a gaseous mixture atmosphere, preferably consisting of 80% of $O_2$ and 20% $Ar_2$, by mole weight, to form a uniform thin masking film 12 of titanium ozide having a thickness of approximately 5,000 angstroms. The percentage of $O_2$ by mole weight may vary from about 60% to 100%. Subsequently, Ti is again subjected to high-frequency sputtering in a gaseous atmosphere consisting only of argon. Thus, a uniform metal titanium film 17 for preventing the interference is formed to a thickness of approximately 1,000 angstroms. A curved photoresist pattern having a channel of 50 microns in width is printed on the metal titanium film 17. Thereafter, the metal film and the oxide film are simultaneously etched with phosphoric acid. The photoresist is removed. Then, a desired curved pattern 21 of titanium oxide with the metal titanium film provided on its surface is formed. The structure thus treated is held for about three hours in contact with a salt 13(FIG. 1) heated to 450°C and containing $Tl_2SO_4$ and $ZnSO_4$ at equal moles, so as to be subjected to the same process as in the foregoing. Then, from the portion 21 with no mask towards the glass plate, a portion larger in refractive index than the interior of the substrate by 0.005 at the surface thereof and by at least 0.0025 elsewhere is formed over a depth of 5 microns and a width of 60 microns. Thus, a curved light conducting path is constructed. It is thus demonstrated that the titanium metal film functions excellently as an interference preventing film and as a protecting mask for the titanium oxide film.

Since the light conducting path obtained by the above method propagates light by subjecting it to total reflection at the glass surface forming one of the walls thereof, the propogation is influenced by inhomogeneity of the glass surface, and an increase in light loss is sometimes caused. In this case, in order to eliminate the influence of the glass surface, corrections as will be described hereunder can be made by burying the light conducting path in the substrate.

The mask pattern is formed in conformity with the method illustrated in FIGS. 1 to 3. As shown in FIG. 1, the resulting structure is held by a holder 16, and is kept for four hours in contact with the foregoing salt heated to 450°C. Then, from the portion 21 without the masks of metal titanium and titanium oxide toward the glass plate, a portion is formed which has a larger refractive index than the glass substrate by 0.005 at the maximum and by at least 0.0025 over a width of approximately 60 microns and a depth of 10 microns. Thereafter, the structure is held for 3 hours in contact with $KNO_3$ salt heated to the same temperature. Then, in correspondence with the portion 21 having no masks, the refractive index decreases by 0.005 at the surface of the glass plate and by 0.0025 at a depth of approximately 5 microns. Consequently, a portion is formed in the interior of the glass substrate, the portion extending with the center at the portion 21 and from approximately 5 microns to 10 microns as measured from the surface of the glass substrate, having a width of approximately 60 microns and being higher in the refractive index than the surrounding portion by 0.0025 or more. The portion of the higher refractive index can be used as a light conducting path.

As described above in detail, according to the present invetion, minute light conducting paths of any desired shape as are small in light loss can be obtained at a small number of manufacturing steps and stably.

Although the invention has been described herein with reference to the specific embodiments, many modifications and variations therein will readily occur to those skilled in the art. All such modifications and variations are included within the intended scope of the invention as defined by the following claims.

We claim:

1. A method for manufacturing an integrated optical circuit comprising:

forming a mask of a material selected from the group consisting of Ti, Ta, Nb, Nr, Cr and Al and the oxides of these metals on a transparent glass substrate containing monovalent positive ions, said mask defining a desired optical circuit pattern; and promoting ion exchange within the substrate by contacting it with a molten salt containing monovalent positive ions which have a greater effect on the refractive index than the nonovalent positive ion in the substrate, whereby the refractive index of a portion of the substrate in the vicinity of the surface thereof which is not masked is made higher than the refractive index of the remainder of the substrate.

2. A method for manufacturing an integrated optical circuit comprising:

forming a two layered mask which defines a desired optical circuit pattern on a glass substrate containing monovalent positive ions, one layer of said mask consisting of an oxide of Ti, Ta, Nb, Zr, Cr, or Al and the other layer of said mask consisting of Ti, Ta, Nb, Zr, Cr, or Al; and promoting ion exchange within the substrate by contacting it with a molten salt containing monovalent positive ions which have a greater effect on the refractive index than the monovalent positive ions in the substrate, whereby the refractive index of a portion of the substrate in the vicinity of the surface thereof which is not masked is made higher than the refractive of the remainder of the substrate.

3. A method of manufacturing an integrated optical circuit comprising:

forming a mask that defines a desired optical circuit pattern on a transparent glass substrate containing monovalent positive ions by high-frequency sputtering of a material selected from the group consisting of Ti, Ta, Nb, Zr, Cr, and Al in a gaseous atmosphere that contains at least 60 percent $O_2$ by mole weight;

continuing said sputtering to form a second layer on said mask after reducing the concentration of $O_2$ in the atmosphere to less than 40 percent by mole weight, the remainder of the atmosphere being an inert gas; and promoting ion exchange within the substrate by contacting it with a molten salt containing monovalent positive ions which have a greater effect on the refractive index than the monovalent positive ions in the substrate, whereby the refractive index of a portion of the substrate in the vicinity of the unmasked surface thereof is made higher than the refractive of the remainder of the substrate.

4. The method of claim 2, further comprising promoting additional ion exchange within said substrate by contacting it with a molten salt containing monovalent positive ions which have a lesser effect on the refractive index than the monovalent positive ions in the substrate.

5. The method of claim 4, wherein said mask remains on said substrate while said additional ion exchange takes place.

6. The method of claim 4, wherein said mask includes Ti.

* * * * *

UNITED STATES PATENT OFFICE

CERTIFICATE OF CORRECTION

Patent No. 3,857,689 Dated December 31, 1974

Inventor(s) Koizumi, K.; Sumimoto; Matsushita; & Furukawa

It is certified that error appears in the above-identified patent and that said Letters Patent are hereby corrected as shown below:

In Column 8:

Claim 1, line 11, "nonovalent" should be --monovalent--.

Claim 1, line 11, "ion" should be --ions--.

Signed and sealed this 1st day of April 1975.

(SEAL)
Attest:

RUTH C. MASON
Attesting Officer

C. MARSHALL DANN
Commissioner of Patents
and Trademarks